Figure 1:
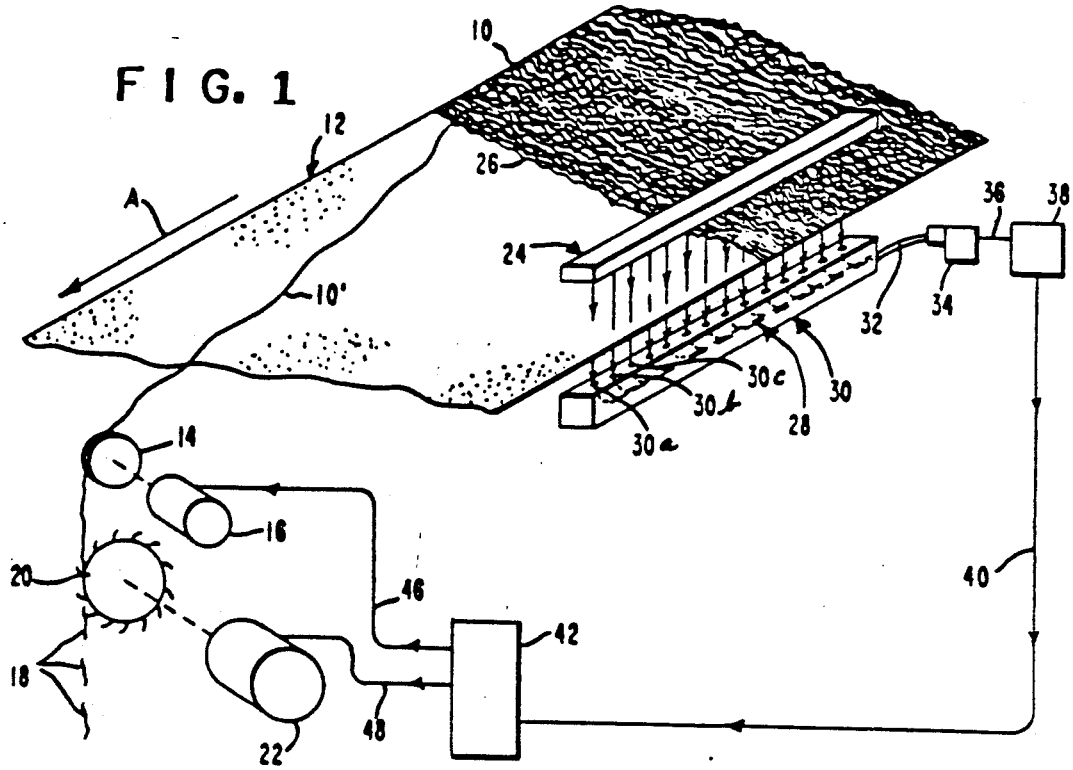
Figure 2:
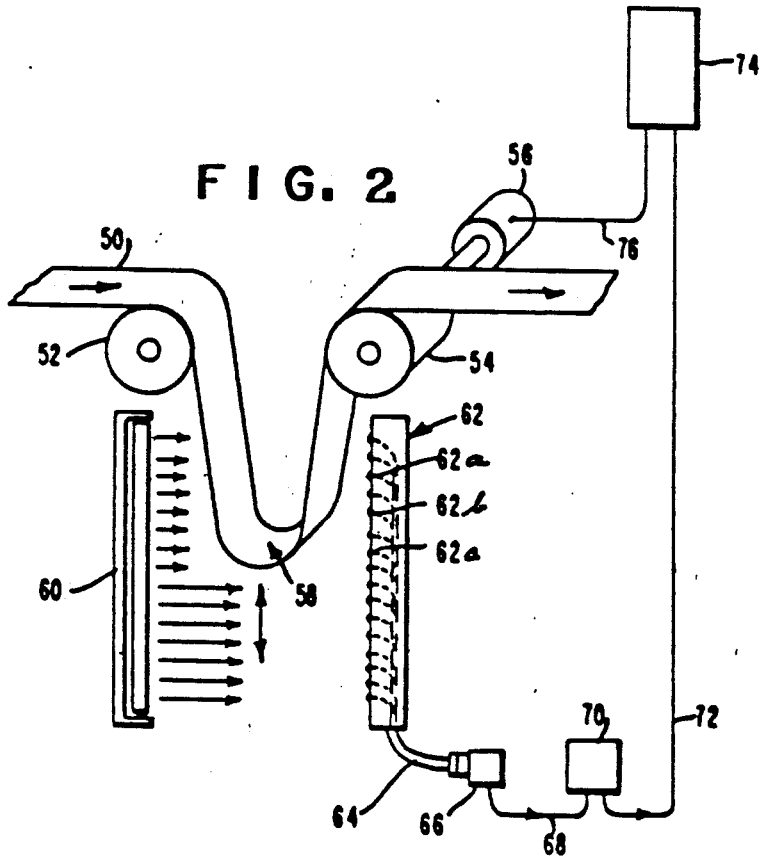

BEST AVAILABLE COPY

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JANUARY 21, 1969

858 O.G. 724

T858020

696,062

TOW DRYER CONTROL APPARATUS

Anthony R. Leana, Newark, Del., assignor to I. E. du Pont de Nemours and Company, Wilmington, Del., a corporation of Delaware

Filed Jan. 5, 1968. Published Jan. 21, 1969
Class 250—227
1 Sheet Drawing. 10 Pages Specification

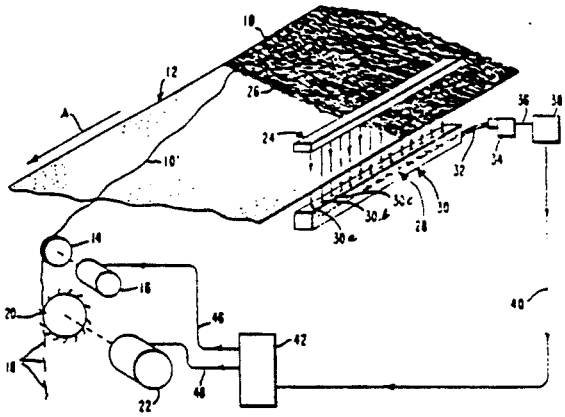

An apparatus for monitoring the position of an edge formed by a continuously moving sheet of textile material and proportionately regulating the rate of withdraw of the material. The "edge" may be the end of a sheet or the lowest portion of a tension-free loop. The apparatus includes an elongated light source (e.g., a fluorescent lamp), to illuminate the forward traverse sheet edge, and a multiplicity of fiber optic elements, the light transmitted to the spatially positioned input ends of the fiber optic elements being determined by the position of the sheet edge. The output ends of the fiber optic elements are brought together adjacent a photoelectric device, which, based upon the sum of the illumination transmitted thereto, produces an electrical signal proportional to the position of the sheet edge. This electrical signal, by conventional circuitry regulates the rate of withdraw of the textile material, by control of a withdrawal means (e.g., pull-rolls). The apparatus has particular utility as a tow dryer control.

BEST AVAILABLE COPY

INVENTOR
ANTHONY R. LEANA

Eugene Berman

AGENT